(12) United States Patent
Schneiter et al.

(10) Patent No.: US 7,356,533 B1
(45) Date of Patent: Apr. 8, 2008

(54) DATABASE SEARCH IN DISTRIBUTED COMPUTER SYSTEM ON PORTION OF REMOTE DATABASE

(75) Inventors: Andrea M. Schneiter, Latham, NY (US); John L. Schneiter, Latham, NY (US); Mark R. Gaulin, Albany, NY (US)

(73) Assignee: GlobalSpec, Inc., Troy, NY (US)

( * ) Notice: Subject to any disclaimer, the term of this patent is extended or adjusted under 35 U.S.C. 154(b) by 103 days.

(21) Appl. No.: 09/286,043

(22) Filed: Apr. 5, 1999

(51) Int. Cl.
*G66F 7/00* (2006.01)
*G06F 17/30* (2006.01)
*G06F 15/16* (2006.01)

(52) U.S. Cl. ............................ 707/10; 707/3; 707/100; 707/104.1; 709/217; 709/218; 709/227

(58) Field of Classification Search ................ 707/1–5, 707/9, 10, 100, 101–104.1, 201, 203, 204; 705/1, 26, 27; 709/217, 218, 227; 726/12
See application file for complete search history.

(56) References Cited

U.S. PATENT DOCUMENTS

| | | | |
|---|---|---|---|
| 5,319,542 A | 6/1994 | King, Jr. et al. ............. 364/401 |
| 5,506,984 A | 4/1996 | Miller ......................... 395/600 |
| 5,721,832 A | 2/1998 | Westrope et al. ............ 395/227 |
| 5,748,954 A | 5/1998 | Mauldin ...................... 395/610 |
| 5,758,327 A | 5/1998 | Gardner et al. ............... 705/26 |
| 5,774,357 A * | 6/1998 | Hoffberg et al. ............. 713/600 |
| 5,778,368 A * | 7/1998 | Hogan et al. ................. 707/10 |
| 5,805,820 A | 9/1998 | Bellovin et al. .......... 395/200.55 |
| 5,812,776 A | 9/1998 | Gifford .................. 395/200.47 |
| 5,826,269 A | 10/1998 | Hussey ......................... 707/10 |
| 5,855,020 A | 12/1998 | Kirsch .......................... 707/10 |
| 5,937,163 A * | 8/1999 | Lee et al. .................... 709/218 |
| 5,991,751 A * | 11/1999 | Rivette et al. ................. 707/1 |
| 6,061,681 A * | 5/2000 | Collins .......................... 707/5 |
| 6,108,686 A * | 8/2000 | Williams, Jr. ............... 709/202 |
| 6,484,161 B1 * | 11/2002 | Chipalkatti et al. ............ 707/3 |

OTHER PUBLICATIONS

Evaggelia Pitoura and Bharat Bhargava; "A Framework for Providing Consistent and Recoverable Agent-Based Access to Heterogeneous Mobile Databases"; ACM; vol. 24; No. 3; Sep. 1995; pp. 44-49.*

* cited by examiner

*Primary Examiner*—Ella Colbert
(74) *Attorney, Agent, or Firm*—Wayne F. Reinke, Esq.; Heslin Rothenberg Farley & Mesiti P.C.

(57) ABSTRACT

In a distributed computer system, such as the World Wide Web portion of the Internet, a first computer requests to a second computer remote from the first computer to search information of at least one entity. The first computer indicates to a search agent associated with the second computer at least one search criterion for the search. The search agent accesses at least one database remote from the first and second computers that stores information of a number of entities, including the at least one entity. The at least one entity is less than all of the plurality of entities with information in the at least one database. A search based on the at least one search criterion is performed by the search agent only on the portion of the database related to the at least one entity. In one embodiment, the first computer is associated with a buyer, the second computer allows access to a Web site of a merchant offering goods and/or services for sale, and the portion of the database relevant to the merchant stores an electronic catalog of the goods and/or services of the merchant.

48 Claims, 4 Drawing Sheets

╱─31

| COMMONLY USED SPECS |

Note: You can skip any field that you do not care about.

Suppliers to Search:

Select supplier(s) to search:  ╱─33  | Sensotec Inc. ▼ |   Help!

This allows you to search the products of only one supplier.

---

Pressure Range To Measure:  ╱─32

Pressure that you need to measure:   From [    ] | psi ▼ |   Help!

To [    ] (same units)

Allow up to [    ] ▼ overrange/margin   Help!

Use the overrange/margin to restrict your search to items whose full-scale renge is close to your requirements.
(Overrange/margin requires both 'From'and 'To'values to work.)

---

Pressure Measurement Type:

Pressure sensor types:  ☐Absolute  ☐Gauge  ☐Differential   Help!
☐Sealed

---

Electrical Output:

☐ Analog Current(4-20mA, etc.)  ☐ Digital Serial   Help!
☐ Analog Voltage  ☐ Digital Parallel
☐ Other Analog (AM, FM, etc.)  ☐ Other Digital (TTL, etc.)
 ☐ Switched/Alarm Analog Current = 4-20mA, or any other analog current output
analog Voltage = any analog voltage output
Other Analog = any analog output other than current or voltage: AM, FM, etc.
Digital Serial = RS232, RS422, RS485, etc.
Digital Parallel = Printer port, Centronics port, IEEE488, etc.
Switched/Alarm = the "output" is a change in state of a switch or an alarm

| Submit Search Form |   Search Tip: Start off by adding only one or two search criteria and see what you get. Refine your criteria on your next search.

*fig. 3A*

| Additional Specs |
|---|

Note: You can skip any field that you do not care about.
Category of Device:
  ☐ Sensor Element/Chip         ☐ Gauge/Indicator      Help!
  ☐ Sensor/Transducer           ☐ Instrument/Meter
     Sensor Element/Chip = "raw" sensor, with no packaging
     Sensor/Transducer = transducer/sensor element, with packaging
       and/or signal conditioning
     Gauge/Indicator = A sensor with integrated dial or simple readout
     Instrument/Meter = self-contained unit; produces Output locally; usually
       includes signal processing or analysis Accuracy:
Min accuracy:         Better than [Don't care ▼] (+/-% of full scale) Help!
Technology Used:
Sensor Technologies:     ☐ Piston ☐ Diaphragm ☐ Strain Gauge   Help!
                         ☐ Piezo electric ☐ Vibrating Element Material to Measure:
Do you need to measure a liquid?    [Don't care ▼]   Help!

Do you need to measure a gas?      [Don't care ▼]   Help!

Features:
Temperature Compensation?        [Don't care ▼]   Help!

Temperature output also?           [Don't care ▼]   Help!

Output "negative" pressures?       [Don't care ▼]   Help!

Environment:
Operating Temperature:    From [    ] [F ▼]   Help!
                           To [    ] (same units)   Help!
    Avoid entering 'normal' operating temperature ranges (i.e.: neither
    'very high' nor 'very low') because some suppliers do not provide
    this data for products that have 'typical' vales, and your search
    may fail to find those products that have no data.

Maximum shock:         At least [    ] [G ▼]   Help!

Maximum vibration:       At least [    ] [G ▼]   Help!
    Avoid entering 'normal' shock and vibration criteria (i.e.: neither
    'very high' nor 'very low') because some suppliers do not provide
    this data for products that have 'typical' vales, and your search
    may fail to find those products that have no data.

[Submit Search Form]     [Reset to Previous Values]

*fig. 3B*

DATABASE SEARCH IN DISTRIBUTED COMPUTER SYSTEM ON PORTION OF REMOTE DATABASE

BACKGROUND OF THE INVENTION

1. Technical Field

The present invention generally relates to database searches in distributed computer systems. More particularly, the present invention relates to database searches in distributed computer systems on a portion of a remote database.

2. Background Information

Companies doing business on the World Wide Web portion of the Internet are faced with growing pressure to provide detailed product and/or service information sufficient for potential buyers to find products and/or services that meet their needs and enable them to make informed buying decisions. Companies have responded to this pressure by developing Web sites that include such information, along with searching capabilities. Software exists that enables companies to develop, implement and maintain their own product and/or service databases.

However, such an undertaking requires the building of a product database that includes sufficient detail for a user to "zero in" on appropriate products and/or services, and making the database searchable using, for example, a database language such as Structured Query Language (SQL). In addition, the undertaking requires a search engine, as well as financial and human resources to keep the database current. This can be a daunting task and financially burdensome for smaller companies and companies lacking the in-house talent to create and maintain such a database, even with the available software. In addition, there is also the cost of and lost time for training to use the software to create, implement and maintain the database.

Thus, a need exists for an easier way for companies or other entities to provide searchable databases of product/service information or other information.

SUMMARY OF THE INVENTION

Briefly, the present invention satisfies the need for an easier way to provide searchable databases of information by providing a remote, centralized database searchable based on one or more criteria. The creation and/or implementation and/or maintaining of a product and/or service or other database and/or search capability is handled by another party for the company or other entity desiring a searchable database.

In accordance with the above, it is an object of the present invention to provide a way to perform a database search on a distributed computer system.

The present invention provides, in a first aspect, a method of performing a database search on a distributed computer system. The method comprises requesting from a first computer to a second computer remote from the first computer in the distributed computer system to search information of at least one entity. The method further comprises indicating from the first computer to a search agent associated with the second computer at least one search criterion for the search, and accessing by the search agent at least one database remote from the first computer and second computer in the distributed computer system. The at least one database comprises information of a plurality of entities, including the at least one entity, and the at least one entity comprises less than all of the plurality of entities. The method also comprises performing a search by the search agent, based on the at least one search criterion, on only the information of the at least one entity in the least one database.

The present invention provides, in a second aspect, a system for performing a database search on a distributed computer system. The system comprises a first computer, a second computer coupled to and remote from the first computer, and at least one database coupled to the second computer and remote from the first computer and second computer. The at least one database comprises information of a plurality of entities. The system further comprises means for requesting from the first computer to the second computer to search information of at least one entity, a search agent associated with the second computer for performing a search on only the information of the at least one entity in the at least one database, means for indicating from the first computer to the search agent at least one search criterion for the search, and means for accessing by the search agent the at least one database. The at least one entity comprises less than all of the plurality of entities.

The present invention provides, in a third aspect, an article of manufacture, comprising at least one computer usable medium having computer readable program code means embodied therein for performing the method of the first embodiment.

These, and other objects, features and advantages of this invention will become apparent from the following detailed description of the various aspects of the invention taken in conjunction with the accompanying drawings.

BRIEF DESCRIPTION OF THE DRAWINGS

FIGS. 3A and 3B depict an exemplary electronic search form useful with the present invention.

BEST MODE FOR CARRYING OUT THE INVENTION

The present invention provides a method and system for performing a database search on a distributed computer system. The invention relieves companies and other entities needing a database from storage and operation and, optionally, creation and maintenance of searchable databases. A remote centralized database stores the information of a number of entities, and is partitioned by entity. At least one and less than all of the entity-specific portions of the partitioned database is searched. This is different from database searching where a search is performed on the entire database.

Figure 1:
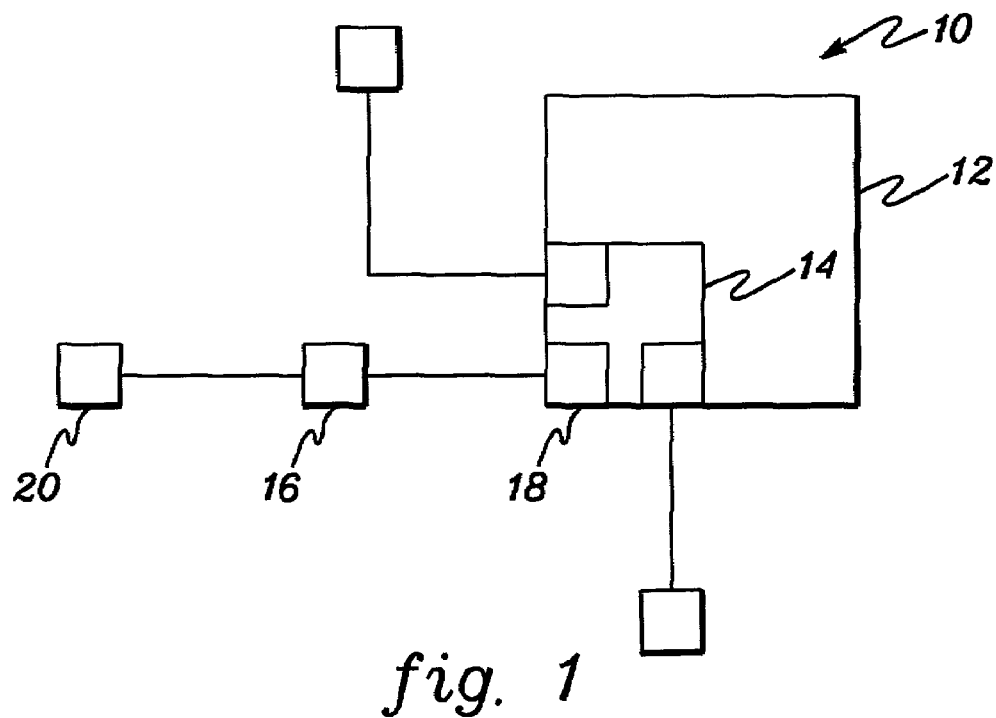
FIG. 1 is a block diagram of a portion of a simplified distributed computer system employing the present invention.

FIG. 1 is a block diagram of a portion of a simplified distributed computer system 10 employing the present invention. System 10 comprises a database computer 12 storing a central database 14. A plurality of remote client computers, e.g., client computer 16, each have access to a portion of the central database. The database stores information relevant to the client computers or entities associated with them. When a client accesses the central database, it only has access to the portion of the central database storing its relevant information, i.e., the client database. For example, client computer 16 has access only to portion 18 of the central database containing its information, as described in more detail below. In this regard, the central database serves as offsite storage of the client database for the client computers.

Central database 14 is partitioned by client. For example, portion 18 represents, for instance, records 0-1000 of central database 14. Thus, any client-specific searches access only the portion of the database partitioned for that client.

A remote user computer 20 desiring access to the information for a particular client computer accesses the client computer to do so. Although the database containing the information is stored in central database 14 in database computer 12, the user does not perceive an effect on access to the information. A search by the user is performed on the client portion of the central database. Preferably, the search takes place where the relevant database portion is located, in this case, at database computer 12.

However, it will be understood that the search need not take place where the relevant database portion is located. For example, if the client computer could access the database portion quickly enough, or if the client could make temporary copies of all or a relevant part of the database portion, then the search might actually be carried out at the client computer while still relieving the client computer of long-term storage issues. As another example, the client computer could transfer a computer program or "agent" (e.g., a JAVA™ applet) to the user computer that actually runs on the user computer and performs the search, accessing the database directly or indirectly.

It will also be understood that the central database need not be stored in a single place or on a single computer. The central database could be spread across more than one storage facility at the same or different locations. Further, even a portion of the central database storing the information for a particular client may be stored in more than one storage facility and/or location and/or computer.

The creation of the database portions can be accomplished by the entity controlling the database computer, the client, or a third party. Further, the entire database or individual database portions could be maintained by the entity controlling the database computer, the client or a third party. For example, a client might choose to maintain its own database portion. In that case, an appropriate software interface would be provided to the client to allow for access. For example, such a software interface might allow maintenance via the World Wide Web, or might provide direct access from the client computer to the database computer using, for example, a modem and phone lines. In one exemplary embodiment, the interface is platform independent, using a web browser and appropriate HTML and/or JAVA™ coding.

In another exemplary embodiment, a program developed for the client's operating system (e.g., WINDOWS™) is loaded onto the client computer. Such a program could, for example, utilize a spreadsheet for the client database contents. Each row could list a different client product, and each column could describe a different characteristic of that product. The client could then select existing or new cells, and make the necessary changes. Appropriate software located at the database computer, for example, could then extract the data in the spreadsheet and place it in the database. One skilled in the art will be able to devise various ways of providing such an interface.

The scenario described with respect to FIG. 1 is useful in many different real world situations. For example, assume that the distributed computer system is a global computer network, such as, for example, the World Wide Web portion of the Internet. Assume also that the clients comprise merchants selling goods and/or services through their Web sites, often referred to as "e-commerce". Thus, computer 16 in FIG. 1 provides access to a Web site of a merchant or seller, and database portion 18 stores a product and/or service catalog of the merchant. Similarly, computer 20 in FIG. 1 is that of a purchaser or buyer of the products and/or services of the merchant. As used herein, the terms "purchaser" and "buyer" include actual buyers, potential buyers, and any party simply gathering information. The computers are coupled by any number of means, such as, for example, telephone lines and modems, or coaxial cables and cable modems, or a mixture, and any necessary communications software.

One example of creating a product and/or service database will now be given, in which the products and/or services each have one or more associated features and/or values. The term "features" is meant to include any characteristics used in the relevant industry or within the relevant group to describe one or more performance capabilities of the product/service. For example, a numeric range or "yes" or "no" may be associated with a given feature of a good, such as, for example, an operating temperature range for a part. For services, one might associate materials that a given company is competent to work with, or the physical capabilities of its machinery for a given job.

It will be understood that computer 16 could be a computer controlled by the merchant, or it could be that of a Web site hosting service. Further, computer 16 could comprise more that one computer at the same or different locations. Similarly, computer 20 could be part of, for example, a local area network or a wide area network. Single computers are shown for simplicity and ease of understanding.

Finally, assume also that database computer 12 in FIG. 1 is that of a company that compiled and maintains database portion 18, and which also provides a searching capability at computer 12 for the database portion. It will be understood that this is a simplified example, and there may be intermediary computers coupled to the distributed computer system (in this case, the World Wide Web) between the buyer computer and/or the seller computer and/or the database computer.

Database portion 18 is partitioned by company name and may comprise information such as, for example, product names, model numbers and detailed information about particular products and/or services. For example, in the case of a pressure sensor as the product, rated pressure, burst pressure, electrical output type, shock and vibration capability, operating temperature limits and other information useful to typical buyers of such products may be included.

Figure 2:
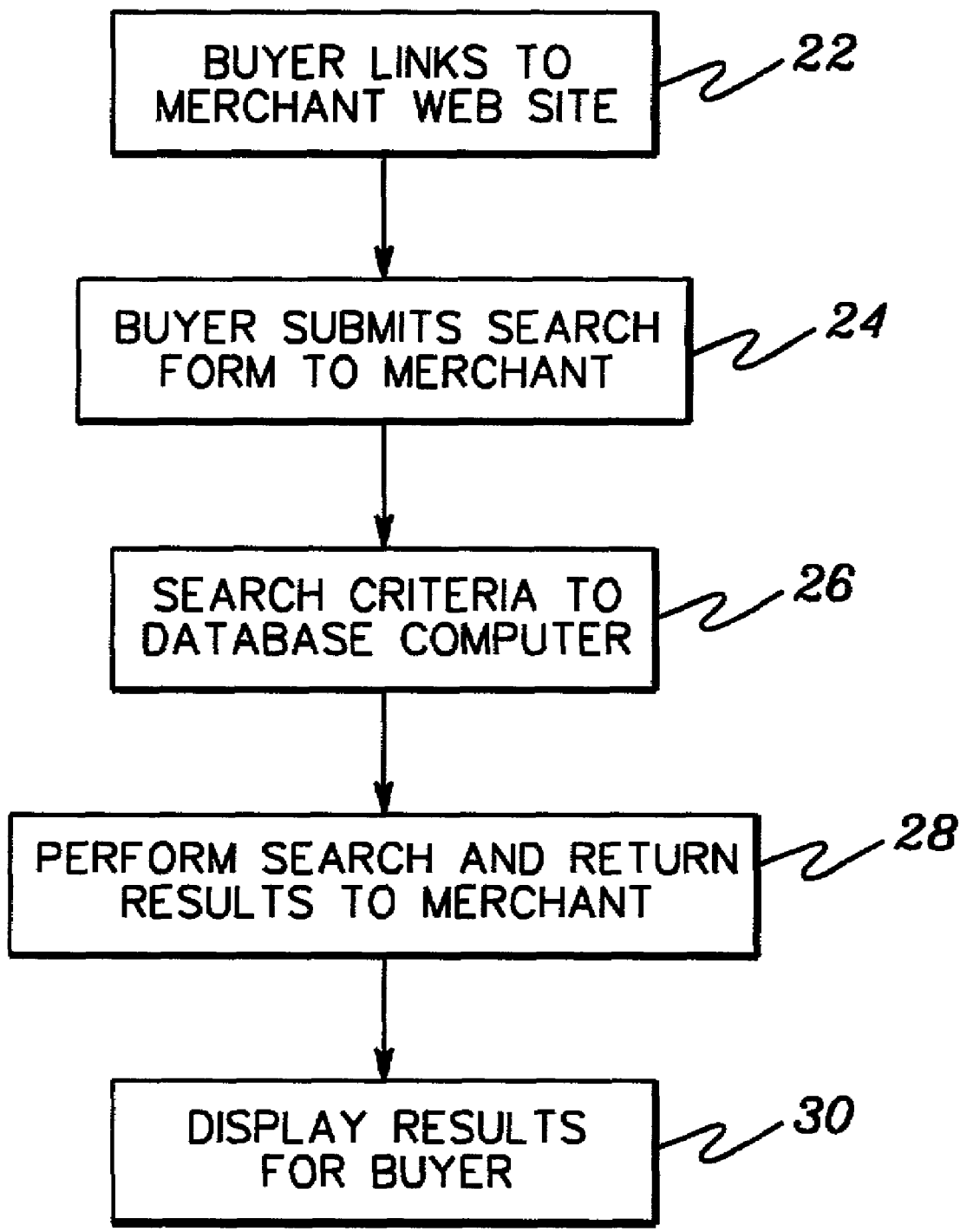
FIG. 2 is a flow diagram of a first embodiment of the present invention.

In one embodiment, described with reference to the flow diagram of FIG. 2, a buyer using computer 20 links, via a browser, to the Web site of a merchant through computer 16 (STEP 22, "BUYER LINKS TO MERCHANT WEB SITE"), indicating a desire to search the products offered by the merchant. The merchant Web site contains the appropriate software calls (for example, hypertext markup language or HTML) for communicating with database computer 12. The buyer fills in an electronic search form presented at the merchant Web site, and submits the search form to computer 16 (STEP 24, "BUYER SUBMITS SEARCH FORM TO MERCHANT"). Computer 16 passes the search parameter(s), i.e., at least one search criterion, to database computer 12 where the search is performed by a search agent residing at the database computer (STEP 28, "SEARCH CRITERIA TO DATABASE COMPUTER"). It will be understood that the at least one search criterion may be a null criterion such that all the information of the merchant is returned in a search.

The search agent searches only database portion 18 in accordance with the search parameter(s) or criteria, collects the appropriate data, processes it into an agreed-upon format, and sends the information back to computer 16 (STEP 30, "PERFORM SEARCH AND RETURN RESULTS TO MERCHANT"). Computer 16 performs any final processing on the resulting data and presents it for display to the buyer at computer 20 (STEP 32, "DISPLAY RESULTS FOR BUYER"). At this point, the buyer may select one or more items for purchasing. The software handling the actual purchase, commonly called "e-commerce software" could reside on computer 16, computer 12 or a third party computer.

FIGS. 3A and 3B depict an exemplary electronic search form 31 for use in the embodiment described above. Search form 31 includes various fields for describing physical characteristics of pressure sensors. For example, field 32 is for a lower limit of pressure range to measure. Also shown is field 33, which lists the merchant of interest.

In a second exemplary embodiment, when the buyer indicates to computer 16 through computer 20 a desire to search the merchant's database, signals are sent from the computer 16 to database computer 12 causing database computer 12 to send the electronic search form (see, e.g., FIGS. 3A and 3B) directly to the buyer at computer 20 through another path (not shown). After the buyer fills out the form, it is sent directly back to database computer 12. Search processing takes place as in the first embodiment, and the results are sent directly to the buyer at computer 20 in an appropriate format, for example, in a tabular format. Preferably, the format is compatible with the look and feel of the merchant's Web site, such that the buyer is provided with a consistent experience. Hypertext links are provided by the database computer on the buyer's screen so that navigation to other parts of the merchant's Web site may be carried out.

In a third exemplary embodiment, computer 16 is that of a search engine, for example, Yahoo!™. The operation is otherwise the same as above, except that the search engine, in response to indications from computer 20, may search more than one and less than all portions of central database 14. For example, search field 33 could instead be multiple merchant search fields, or one field allowing for multiple merchants to be chosen.

In a fourth exemplary embodiment, the search agent is a computer program (e.g., a JAVA™ applet) sent from computer 16 to computer 20 in a response to a request for searching from computer 20. The search agent runs on computer 20 and provides the search capability, accessing database portion 18.

In a fifth exemplary embodiment, the merchant's Web site includes a link to a Web site of the entity controlling database computer 12, which may reside on computer 12. After linking, the buyer is preferably presented with a Web page very similar to the merchant's, providing a consistent experience, where an electronic search form is accessible. The search agent resides on the database computer, and the search results are displayed on the database computer entity's Web site.

Preferably, as in the exemplary embodiments above, the search agent is in some manner associated with the merchant computer. The search agent either resides at the merchant computer, is transferred from the merchant computer or is accessed via a link on the merchant computer.

Figure 4:
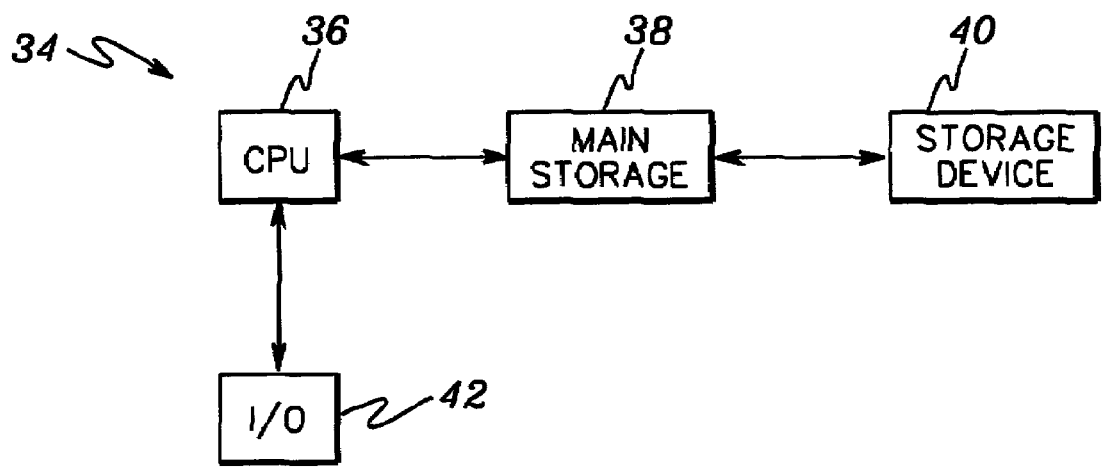
FIG. 4 is a block diagram of a generic computer useful with the present invention.

FIG. 4 is a block diagram of an exemplary generic computer 34 that could act as any of the computers described with respect to FIG. 1. Computer 34 comprises, for instance, one or more central processing units (CPUs) 36, a main storage 38, one or more storage devices 40, and I/O device(s) 42.

In general, central processing unit(s) 36 contain the sequencing and processing facilities for instruction execution, interruption action, timing functions, initial program loading and other machine related functions. Central processing unit(s) 36 are coupled to main storage 38 which is directly addressable and provides for high-speed processing of data by the CPUs. Main storage 38 may be either physically integrated with the CPUs or constructed in stand-alone units. Main storage 38 is also coupled to storage device(s) 40. Data is transferred from main storage 38 to storage device(s) 40 and from the storage device(s) back to main storage. I/O device(s) 42 may comprise, for example, a keyboard and/or pointing device and/or monitor. As is known, a user and the computer communicate through the I/O device(s). One example of a commercially available computer meeting these criteria is a DELL™ Dimension™ V350 minitower, with a Pentium II™ processor operating at 350 MHZ.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of performing a database search on a distributed computer system, comprising:
    requesting from a first computer to a second computer remote from the first computer in the distributed computer system to search information of at least one entity;
    indicating from the first computer to a search agent associated with the second computer at least one search criterion for the information of the at least one entity;
    accessing by the search agent at least one database remote from the first computer and the second computer in the distributed computer system, wherein the at least one database comprises information of a plurality of entities including the at least one entity, and wherein the at least one entity comprises less than all of the plurality of entities; and
    performing by the search agent a search based on the at least one search criterion on only the information of the at least one entity in the at least one database.

2. The method of claim 1, further comprising providing results of the search to the search agent.

3. The method of claim 2, wherein the search agent provides the results of the search to the first computer.

4. The method of claim 3, wherein the search agent is transferred from the second computer to the first computer and runs at the first computer, wherein a communication agent also resides at the first computer, the communication agent performing the requesting and the indicating, and wherein the search agent provides the results of the search to the communication agent.

5. The method of claim 1, wherein the at least one database is stored at least one third computer remote from the first computer and the second computer in the distributed computer system, and wherein the search agent resides at the at least one third computer.

6. The method of claim 1, wherein the search agent resides at the second computer.

7. The method of claim 1, wherein the search agent is transferred from the second computer to the first computer and runs at the first computer.

8. The method of claim 1, wherein the first computer is associated with a buyer, wherein the second computer is associated with a seller, wherein the at least one entity comprises the seller, and wherein the information comprises product and/or service information of the seller.

9. The method of claim 1, wherein the indicating comprises submitting an electronic search form from the first computer to the search agent.

10. The method of claim 1, wherein the distributed computer system comprises a global computer network.

11. The method of claim 10, wherein the global computer network comprises the World Wide Web portion of the Internet.

12. The method of claim 11, wherein the second computer provides access to a Web site of the at least one entity having a particular format, the method further comprising providing results of the search to the second computer in a format compatible with the particular format, enabling the second computer to provide a consistent experience on the Web site to a user of the first computer.

13. The method of claim 1, wherein the at least one database is created by one other than the at least one entity.

14. The method of claim 1, wherein the at least one database is maintained by one other than the at least one entity.

15. The method of claim 1, wherein the at least one database is maintained by the at least one entity.

16. The method of claim 1, wherein the at least one search criterion comprises a null criterion such that the search returns all information of the at least one entity in the at least one database.

17. A system for performing a database search on a distributed computer system, comprising:
a first computer;
a second computer coupled to and remote from the first computer;
at least one database coupled to the second computer and remote from the first computer and the second computer, wherein the at least one database comprises information of a plurality of entities;
means for requesting from the first computer to the second computer to search information of at least one entity in the plurality of entities, wherein the at least one entity comprises less than all of the plurality of entities;
a search agent associated with the second computer for performing a search on only the information of the at least one entity in the at least one database;
means for indicating from the first computer to the search agent at least one search criterion for the search; and
means for accessing by the search agent the at least one database.

18. The system of claim 17, further comprising means for providing results of the search to the search agent.

19. The system of claim 18, further comprising means for providing the results of the search from the search agent to the first computer.

20. The system of claim 19, wherein the means for requesting and the means for indicating comprise a communication agent residing at the first computer.

21. The system of claim 20, wherein the search agent is transferred from the second computer to the first computer and runs at the first computer, the system further comprising means for providing the results of the search to the communication agent.

22. The system of claim 17, further comprising at least one third computer coupled to the second computer and remote from the first computer and the second computer and storing the at least one database, wherein the search agent resides at the at least one third computer.

23. The system of claim 17, wherein the search agent resides at the second computer.

24. The system of claim 17, wherein the search agent is transferred from the second computer to the first computer and runs at the first computer.

25. The system of claim 17, wherein the first computer is associated with a buyer, wherein the second computer is associated with a seller, wherein the at least one entity comprises the seller, and wherein the information comprises product and/or service information of the seller.

26. The system of claim 17, wherein the means for indicating comprises means for submitting an electronic search form from the first computer to the search agent.

27. The system of claim 17, wherein the distributed computer system comprises a global computer network.

28. The system of claim 27, wherein the global computer network comprises the World Wide Web portion of the Internet.

29. The system of claim 28, wherein the second computer provides access to a Web site of the at least one entity having a particular format, the system further comprising means for providing results of the search to the second computer in a format compatible with the particular format, enabling the second computer to provide a consistent experience on the Web site to a user of the first computer.

30. The system of claim 17, wherein the at least one database is created by one other that the at least one entity.

31. The system of claim 17, wherein the at least one database is maintained by one other than the at least one entity.

32. The system of claim 17, wherein the at least one database is maintained by the at least one entity.

33. The system of claim 17, wherein the at least one search criterion comprises a null criterion such that the search returns all information of the entity in the at least one database.

34. An article of manufacture, comprising:
at least one computer usable medium having computer readable program code means embodied therein for performing a database search on a distributed computer system, comprising:
computer readable program code means for causing a first computer to request to a second computer remote from the first computer in the distributed computer system to search information of at least one entity;

computer readable program code means for causing the first computer to indicate to a search agent associated with the second computer at least one search criterion for the information of the at least one entity;

computer readable program code means for causing the search agent to access at least one database remote from the first computer and the second computer in the distributed computer system, wherein the at least one database comprises information of a plurality of entities including the at least one entity, and wherein the at least one entity comprises less than all of the plurality of entities; and computer readable program code means for causing a search to be performed by the search agent based on the at least one search criterion on only the information of the at least one entity in the at least one database.

35. The article of manufacture of claim 34, further comprising computer readable program code means for causing results of the search to be provided to the search agent.

36. The article of manufacture of claim 35, wherein the computer readable program code means for causing results of the search to be provided to the search agent comprises computer readable program code means for causing the search agent to provide the results of the search to the first computer.

37. The article of manufacture of claim 36, wherein the computer readable program code means for causing the first computer to request and the computer readable program code means for causing the first computer to indicate comprise a communication agent, the article of manufacture further comprising:

computer readable program code means for causing the second computer to transfer the search agent to the first computer for running on the first computer; and computer readable program code means for causing the search agent to provide the results of the search to the communication agent.

38. The article of manufacture of claim 34, wherein the computer readable program code means for causing a search to be performed by the search agent comprises computer readable program code means for causing the search to be performed by the search agent residing at least one third computer storing the at least one database and remote from the first computer and the second computer in the distributed computer system.

39. The article of manufacture of claim 34, wherein the computer readable program code means for causing the search agent to access the at least one database comprises computer readable program code means for causing the search agent to access the at least one database from its residence at the second computer.

40. The article of manufacture of claim 34, further comprising computer readable program code means for causing the search agent to be transferred from the second computer to the first computer for running at the first computer.

41. The article of manufacture of claim 34, wherein the first computer is associated with a buyer, wherein the second computer is associated with a seller, wherein the at least one entity comprises the seller, and wherein the information comprises product and/or service information of the seller.

42. The article of manufacture of claim 34, wherein the computer readable program code means for causing the first computer to indicate to the search agent comprises computer readable program code means for causing the first computer to submit an electronic search form to the search agent.

43. The article of manufacture of claim 34, wherein the at least one computer usable medium comprises at least one computer usable medium having computer readable program code means embodied therein for performing a database search on a global computer network.

44. The article of manufacture of claim 43, wherein the at least one computer usable medium comprises at least one computer usable medium having computer readable program code means embodied therein for performing a database search on the World Wide Web portion of the Internet.

45. The article of manufacture of claim 44, wherein the second computer provides access to a Web site of the at least one entity having a particular format, the article of manufacture further comprising computer readable program code means for causing results of the search to be provided to the second computer in a format compatible with the particular format, thereby enabling the second computer to provide a consistent experience on the Web site to a user of the first computer.

46. The article of manufacture of claim 34, wherein the at least one search criterion comprises a null criterion such that the search returns all information of the at least one entity in the at least one database.

47. A system for performing a database search on a distributed computer system, comprising:

a first entity adapted to request from a first computer to a second computer remote from the first computer in the distributed computer system to search information of at least one entity;

a second entity adapted to indicate from the first computer to a search agent associated with the second computer at least one search criterion for the information of the at least one entity;

a third entity adapted to access by the search agent at least one database remote from the first computer and the second computer in the distributed computer system, wherein the at least one database comprises information of a plurality of entities including the at least one entity, and wherein the at least one entity comprises less than all of the plurality of entities; and a fourth entity adapted to perform by the search agent a search based on the at least one search criterion on only the information of the at least one entity in the at least one database.

48. At least one program storage device readable by a machine, tangibly embodying at least one program of instructions executable by the machine to perform a method of performing a database search on a distributed computer system, comprising:

requesting, by a first agent of the distributed computer system, to search information of at least one entity;

indicating, by a second agent of the distributed computer system, at least one search criterion for the information of the at least one entity;

accessing, by a third agent of the distributed computer system, at least one database remote from the first agent and the second agent in the distributed computer system, the at least one database comprising information of a plurality of entities including the at least one entity, the at least one entity comprising less than all of the plurality of the entities; and performing, by a fourth agent of the distributed computer system, a search based on the at least one search criterion on only the information of the at least one entity in the at least one database.

* * * * *

UNITED STATES PATENT AND TRADEMARK OFFICE
CERTIFICATE OF CORRECTION

PATENT NO. : 7,356,533 B1  Page 1 of 1
APPLICATION NO. : 09/286043
DATED : April 8, 2008
INVENTOR(S) : Schneiter et al.

It is certified that error appears in the above-identified patent and that said Letters Patent is hereby corrected as shown below:

Claim 5, Col. 7, Line 11: Delete "stored at least" and insert --stored at at least--

Claim 38, Col. 9, Line 46: Delete "residing at least" and insert --residing at at least--

Signed and Sealed this

Eighth Day of July, 2008

JON W. DUDAS
*Director of the United States Patent and Trademark Office*